No. 676,179.  
G. R. ELLIOTT.  
ROTARY VALVE.  
(Application filed May 7, 1901.)  
Patented June 11, 1901.

(No Model.)  
3 Sheets—Sheet 1.

Witnesses:  
M. A. Hinds  
E. A. Pinnock

Inventor,  
Gilbert R. Elliott;  
By A. B. Upham,  
His Attorney.

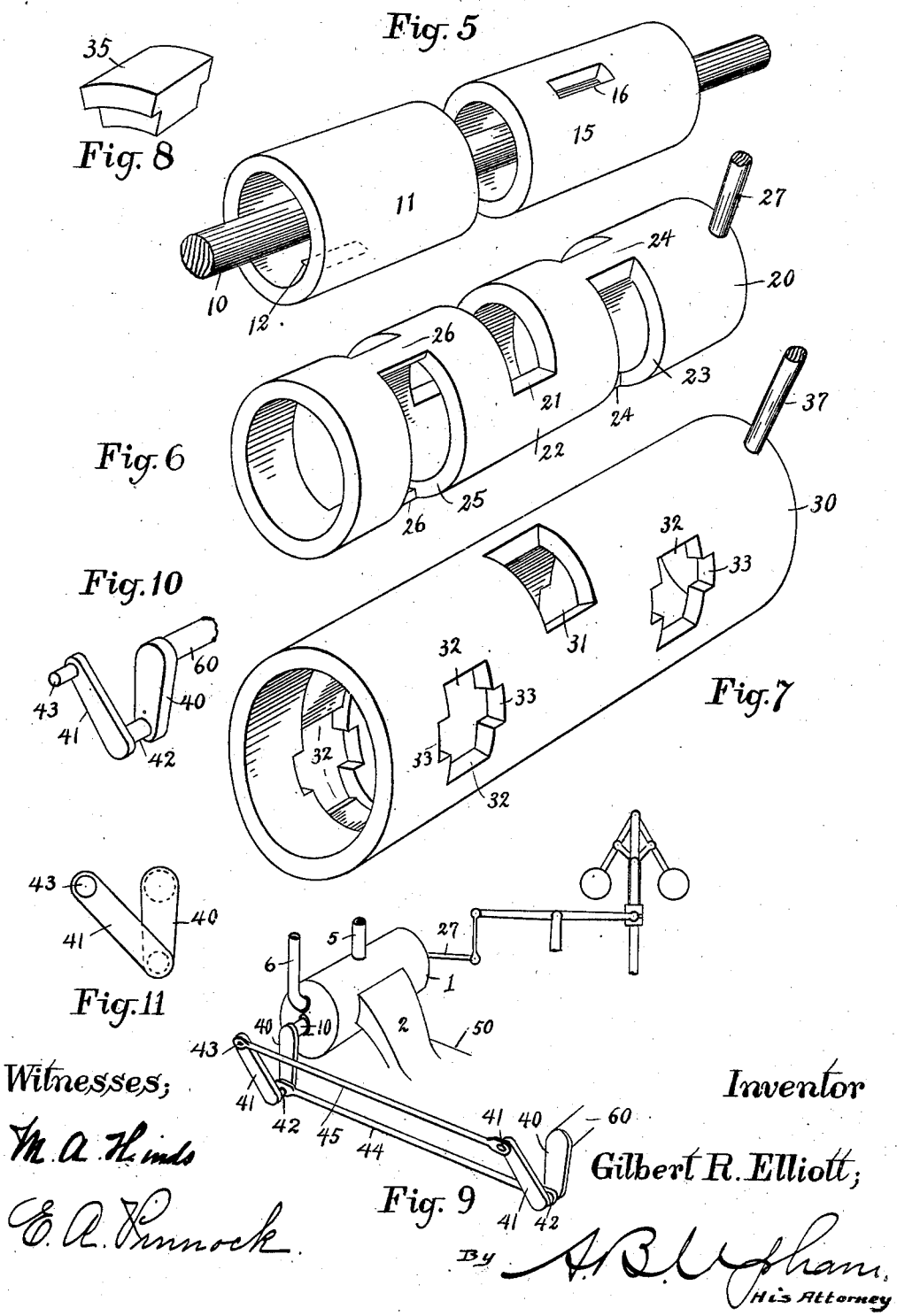

UNITED STATES PATENT OFFICE.

GILBERT R. ELLIOTT, OF BOSTON, MASSACHUSETTS.

ROTARY VALVE.

SPECIFICATION forming part of Letters Patent No. 676,179, dated June 11, 1901.

Application filed March 7, 1901. Serial No. 50,210. (No model.)

*To all whom it may concern:*

Be it known that I, GILBERT R. ELLIOTT, a subject of the King of Great Britain, residing at Boston, county of Suffolk, and State of Massachusetts, have invented certain new and useful Improvements in Rotary Valves, of which the following is a full, clear, and exact description.

This invention is in the line of valves for steam and other engines, the object being to construct a valve which shall be simple and inexpensive and still capable of all the advantages secured by the complicated and costly Corliss valve, so far as relates to avoidance of wiredrawing the steam, obviating back pressure, adjusting the steam-inlet to the load, saving in quantity of steam used, producing a perfectly-balanced valve, and thus preventing loss of power through friction, permitting of the easy reversal of the engine, and at the same time accomplishing all this and more with a valve comprising but a single moving part and two adjustable ones.

Figure 1:
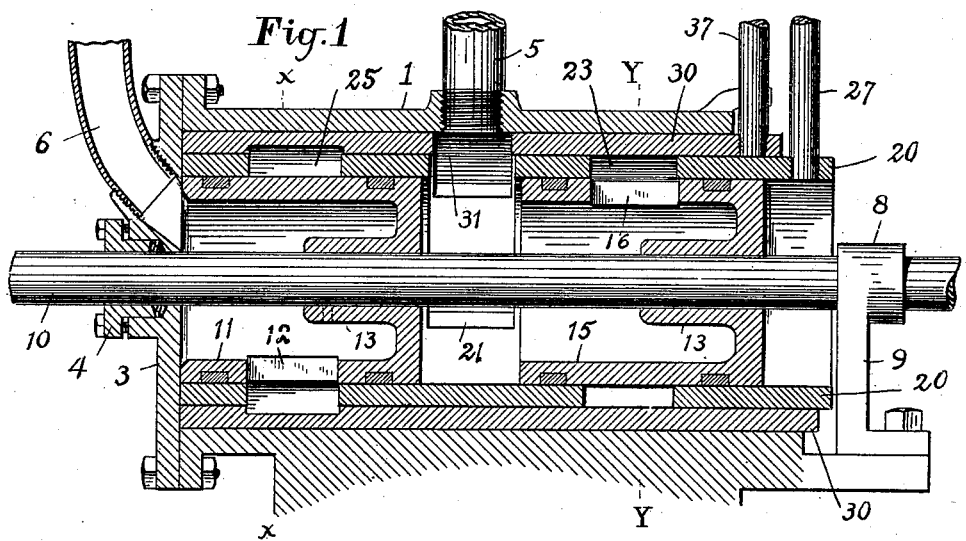
Figure 2:
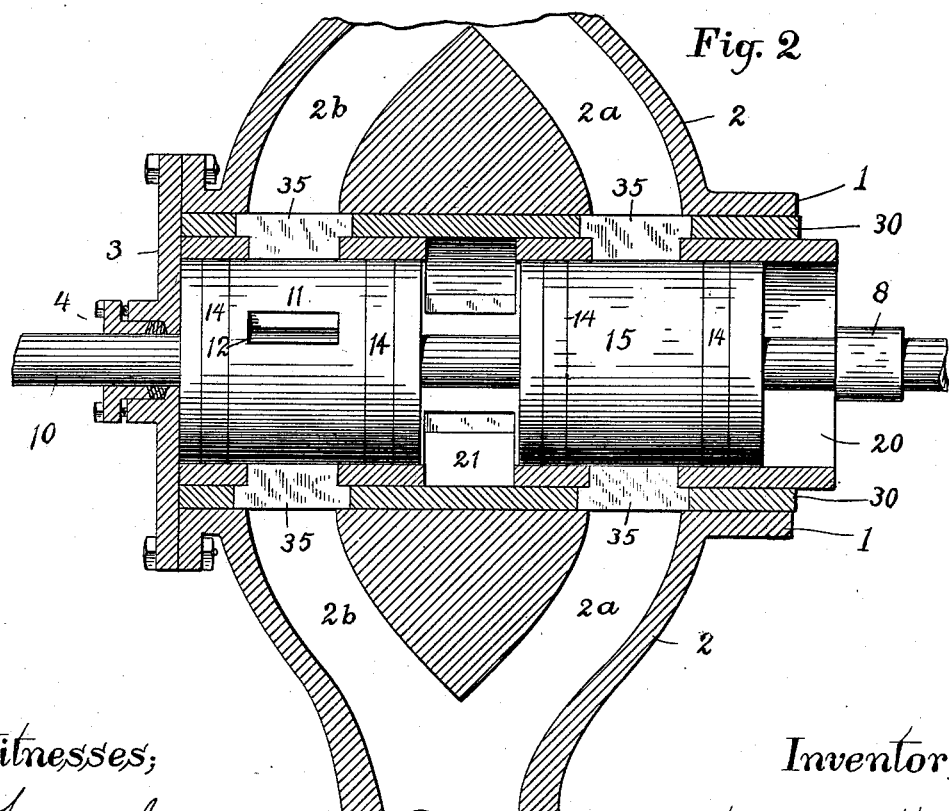
Figure 4:
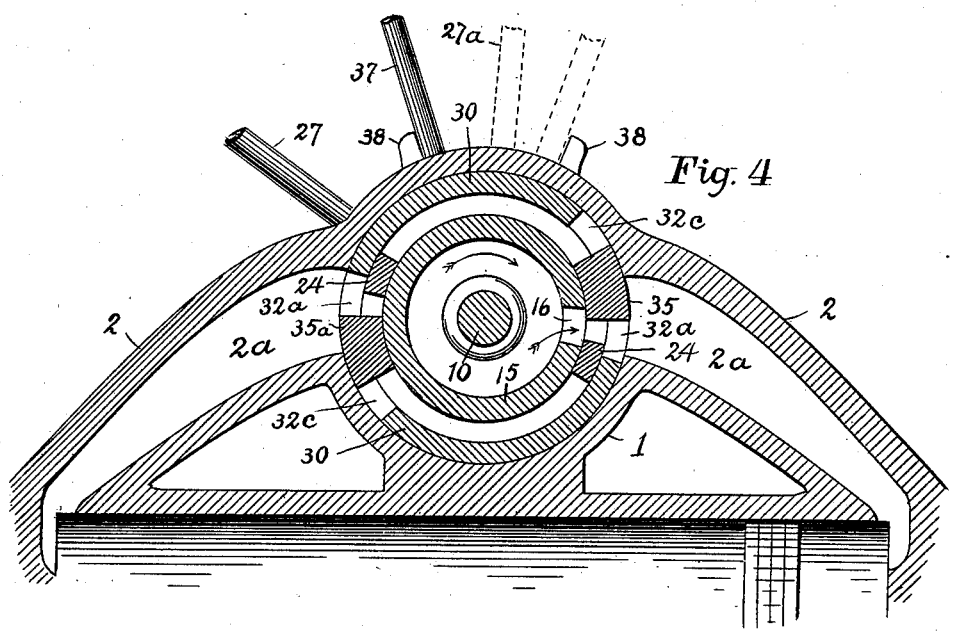
Figure 3:
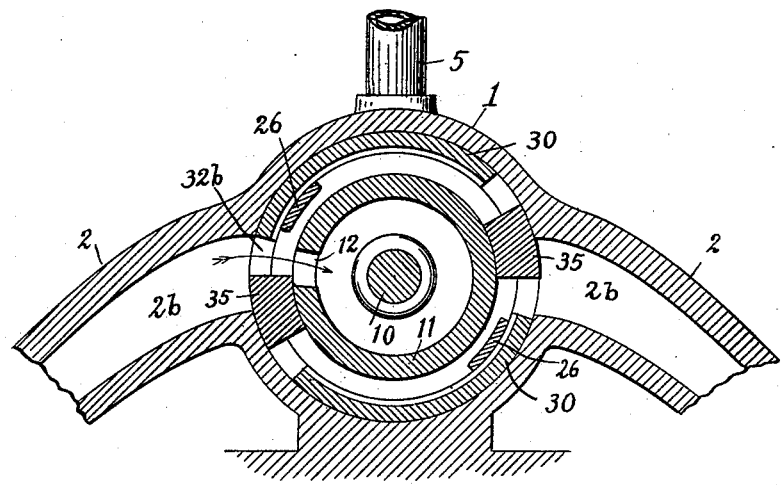

Referring to the drawings forming part of this specification, Figure 1 is a central vertical longitudinal section of my valve. Fig. 2 is a central horizontal section of the same. Fig. 3 is a transverse section of the same on the line X X in Fig. 1. Fig. 4 is a transverse section of the same on the line Y Y in Fig. 1. Fig. 5 is a perspective view of the rotary member of main inlet-valve. Fig. 6 is a perspective view of the cut-off valve. Fig. 7 is a perspective view of the reversing-valve. Fig. 8 is a perspective view of one of the blocks forming part of the reversing-valve. Fig. 9 is a perspective view showing the mechanism for transmitting power from the drive-shaft to the valve-shaft. Fig. 10 is a perspective view of one of the combination-cranks therefor, and Fig. 11 is an end view of the same.

My valve comprises the casing 1, cylindrical in form and provided with the head 3, and the three cylindrical members located within the casing. Steam is introduced to the valve through the pipe 5, and the exhaust taken therefrom through the pipe 6, while the steam passes to and from the valve to the engine-cylinder through the channeled arms 2.

Revoluble in bearings 4 and 8 is a shaft 10, upon which is fixed the two cylindrical members composing the main inlet-valve. These members are each cup-shaped and formed with a hub 13, by which to secure them on said shaft. Of these the member 11 is designed for controlling the exhaust, having the port 12 for the purpose. The other member 15 is designed to control the admission of live steam to the engine-cylinder, the port 16 being the means therefor. Said two members are separated a sufficient distance to freely admit the steam from the pipe 5 into the interior of the valve member 15, as shown in Fig. 1.

Immediately surrounding the main inlet-valve is a cylindrical shell 20, fitting snugly enough to prevent the passage of steam between the contiguous surfaces, while at the same time permitting free rotation of said valve within said shell. Through this shell is a slot 21, located in line with the space between the valve members, said slot extending about three-fourths of the circumference of the shell, but leaving a sufficient neck 22 to rigidly unite the sections of the shell. Through said shell are two other slots 23, both in the same plane and separated by the two narrow necks or blocks 24. These slots are located in the same plane with the ports 16. Near the opposite end of the shell 20 are two other slots, 25, located in the plane of the port 12, but the necks 26 separating the same being so thinned down as to make practically one continuous slot or channel, and the only object of such necks being to bind the parts together. To further render said slots practically continuous, I groove the shell 30 immediately exterior to said slots or channel, as shown in Figs. 1 and 7, in order to allow free passage of the exhaust-steam past the said necks 26. Fitting snugly between said shell 20 and the casing 1 is another shell 30, constituting the reversing-valve. This shell is formed with a slot 31, located in line with the slot 21 of the shell 20, in order to permit of the passage of steam from the pipe 5 to the interior of the valve member 16. This shell is given four other openings 32—two diametrically opposite ones in line with the slot 25 and two similar ones in line with the slots 23. These openings are made cruciform, as shown in Fig. 7, the portion 33 of each opening being designed to receive the block 35, and thereby divide the opening into two ports, as shown in Figs. 3 and 4. The inner part of each block 35 is fitted to the slots 23 or 25, into which it enters—or, in other words, the inner part of each block is shortened to snugly fit between the sides of the slot—while its outer part is lengthened to enter the opening-sections 33 and be thereby held from displacement circumferentially. The outer face of each block is made convex to fit the inner surface of the casing 1, and its inner face is concaved to fit the outer surface of the main inlet-valve.

The operation of my valve is best understood by reference to Figs. 3 and 4. As shown by Fig. 4, when the rotation of the main inlet-valve brings the port 16 out from beneath the block 35 to the space between said block and the neck or bridge 24 the live steam instantly passes through said port, space, and the opening $32^a$ to the channel $2^a$, from which it goes to the end of the engine-cylinder. At the same time the port 12 emerges from beneath its block 35 and permits the exhaust-steam from the opposite end of the cylinder to flow out through the channel $2^b$, opening $32^b$, slot 25, port 12, and thence to the exhaust-pipe 6, as soon as the port 16 passes entirely beneath the neck or bridge 24 and from thence to the dead-space between said bridge and the opposite block 35 no more steam can enter the cylinder; but that already admitted must work expansively for the remainder of the stroke. The port 12, on the other hand, is never closed except when beneath a block 35. Hence the exhaust can freely escape through the whole stroke and until the piston-head almost reaches the cylinder-head, the free escape serving to reduce back pressure to a minimum, while the temporary closure gives the desired cushioning effect to the piston at the end of each stroke.

Fig. 4 illustrates the valve as adapted to shut off the live steam at about one-eighth stroke. To work with considerably less expansion, the lever 27 is moved over to the right to the position $27^a$ or wherever else desired; but at the proposed point the steam would be cut off at half-stroke. If adjusted still farther, or until the bridge 24 meets the block $35^a$, the steam would be cut off at about seven-eighths stroke. If, on the other hand, said bridge is adjusted toward the block 35, the steam is cut off more and more quickly until if said parts come together the steam would be cut off altogether and the engine stopped. It will therefore be evident that I have a range of adjustment varying from seven-eighths or nine-tenths down to zero. By suitably connecting the lever 27 with the engine-governor, as indicated by Fig. 9, such variations in cut-off are automatically provided for in accordance with the load on the engine.

To reverse the engine, all that is necessary is to shift the shell 30 to bring the ports $32^c$ in line with the channels $2^a$, this shifting or adjusting being done by means of the lever 37, and suitable stops 38 being provided for limiting the movements of the lever and bringing an edge of each block 35 $35^a$ in line with the center of the channel $2^a$, as shown in Fig. 4. It will be observed that this shift of said shell similarly moves the exhaust-blocks 35 relative to the channels $2^b$. (Shown in Fig. 3.)

In order to perfectly rotate the shaft 10 in unison with the drive-shaft of the engine, I have devised the construction illustrated by Fig. 9. This comprises the two parallel bars 44 45, connected with the double cranks fixed upon said shafts. Each double crank consists of the crank-arm 40, having crank-pin 42, with a second crank-arm 41, rigidly projecting from said pin at an angle of forty-five degrees with a plane centrally cutting the shaft and crank 40, the length of said second crank-arm being such as to bring the crank-pin 43 at a distance from the shaft prolongation equal to the length of the crank-arm 40. By this arrangement the rotation of the drive-shaft 60 is perfectly communicated to the valve-shaft 10.

It should be explained that the casing-ports $2^a$ $2^b$ are elongated to approximately double the width of each opening 32 in order that the blocks 35 may be shifted in reversing the engine to bring their edges in each case to exactly the same point. By thus bringing the edges of the blocks flush with the center lines of the casing-ports I am enabled to reverse the engine with perfect accuracy as to lap and lead and to accomplish what has never before been done with a rotary valve.

From the above description it is evident that this valve is simple, easily constructed, and comparatively inexpensive. It does not wiredraw the steam, for the reason that the steam is always admitted through practically a wide-open port, no matter to what extent the engine is working expansively. In my valve it is the length of time during which the port remains wide open by which the variations in expansion are obtained; not the variations in width of opening, as in the ordinary slide-valve. The position of the necks 24 (shown in Fig. 4) is practically the extreme limit in working expansively, for in ordinary running said necks are adjusted to points quite a little farther from the blocks 35.

This valve saves the engine from the usual defect of the ordinary slide-valve—that of back pressure, when working expansively—by having the exhaust-port 12 of the main inlet-valve wide open except at the exact moment when the piston-head nearly reaches the cylinder-head, and the cushioning effect of the steam is desired to obviate the shock of the termination of the stroke. In the case of the ordinary slide-valve the adjustment of the valve for working the engine expansively contracts the exhaust-opening, and so makes it more difficult for the exhaust to escape, the energy required for thus forcing it out from the cylinder causing the back pressure complained of. Even when the engine is adjusted to cut off at three-quarters stroke this back pressure remains as an expensive consumer of power. With my valve, however, the instant the port 16 opens to admit live steam at one end of the cylinder the exhaust-port 12 opens wide to permit the escape of the exhaust from the other end, wholly eliminating this objectionable feature of back pressure arising from insufficient means of exit.

Inasmuch as in this valve the engine can work expansively to any extent without in the least interfering with the full escape of the exhaust, as just described, it is not necessary to manipulate the throttle-valve in varying the power desired from the engine; but the adjustment is obtained by shifting the cut-off shell 20, even to the extent of stopping the engine. Since one of the greatest causes of wiredrawing arises from nearly closing the throttle to reduce the amount of steam admitted to the steam-chest of the ordinary engine, I get rid of this cause also for the loss of power.

As shown in Figs. 1 and 2, the main inlet-valve being separated into two sections with the steam admitted between them there is no more pressure on the valve in one direction than in the opposite, and it is hence perfectly balanced, thus saving the great loss of power in friction, which is caused by the excessive pressure of the usual slide-valve upon its seat in the steam-chest.

While my valve is well adapted for use in connection with stationary engines for general power, it is especially valuable for hoisting-engines, automobiles, locomotives, and marine engines. Its particular adaptability to automobiles arises from its simplicity, inexpensiveness, slight weight, and perfection of reversal and cut off.

What I claim as my invention, and for which I desire to secure Letters Patent, is as follows, to wit:

1. The combination of the casing having the ports and the steam inlet and exhaust; and the rotary main inlet-valve therein, having the two diametrically opposite ports, one communicating with the steam-inlet and the other with the exhaust; the casing being adapted to cut off the exhaust-steam to the exhaust-port for but a fraction of the valve's revolution, and to cut off the live steam from the valve-port for at least double the said fraction, substantially as described.

2. In a valve, the combination of the casing having the peripheral ports and steam inlet and exhaust; the main inlet-valve revoluble within said casing and having the two peripheral, diametrically opposite ports, one communicating with the steam-inlet and the other with the exhaust; a member surrounding said valve and having two annular slots one in the same plane with the exhaust-valve port and stopped at two diametrically opposite points, and the other slot stopped at two diametrically opposite points, but with the extent of such stoppage largely in excess of that of the former slot, substantially as described.

3. In a valve, the combination of the casing having the peripheral ports and steam inlet and exhaust; the hollow, cylindrical, revoluble main inlet-valve having the two ports, one communicating with the steam-inlet and the other with the exhaust; a shell surrounding said valve, and having the two slots therein, the one in the plane of the inlet-valve port being permanently stopped at two diametrically opposite points; and four blocks, two stopping each slot at diametrically opposite points in close proximity to the casing-ports, substantially as described.

4. In a valve, the combination of the cylindrical casing having the ports and steam inlet and exhaust; the main inlet-valve revoluble therein; the shell between said valve and casing and having the annular slots in line with said casing-ports; means for angularly adjusting said shell; the blocks held in said slots independent of the adjustment of the shell; and means for preventing the passage of steam longitudinally between the shell and casing, substantially as described.

5. In a valve, the combination of the casing having the centrally-located steam-inlet in its periphery, the terminal exhaust and the peripheral ports; the rotating shaft concentric with said casing; and the two cup-shaped valves fixed on said shaft and opening in the same direction but with a space between them communicating with the steam-inlet, and each having a peripheral port communicating with the casing-ports, substantially as described.

6. In a valve, the combination of the cylindrical casing having the peripheral ports, the central steam-inlet and the terminal exhaust; the main inlet-valve comprising the two cup-shaped sections rotatable in unison; the adjustable shell having the two slots in line with the said casing-ports, and the slot in line with the steam-inlet; and the blocks stopping said slots but not moving therewith, substantially as described.

7. In a valve, the combination of the casing having the ports and the steam inlet and exhaust; the main inlet-valve revoluble within said casing and having the ports; the slotted shell surrounding said valve; the shell filling the balance of the space between said casing and the first-named shell and having the openings; blocks held in said openings but filling only the central part of each, said blocks projecting through the slots of the first-named shell and stopping the same; and means for angularly shifting the last-named shell, substantially as described.

8. In a valve, the combination of the casing having the enlarged ports; the main inlet-valve revoluble within the same; and a cut-off valve comprising blocks normally held with an edge of each coincident with the center line of one of said casing-ports, but adapted, for the reversal of the engine, to have said blocks shifted to bring their opposite edges in the same lines, substantially as described.

9. In a valve, the combination of the casing having the ports and the steam inlet and exhaust; the two-part revoluble main inlet-valve; the slotted shell surrounding said valve; the shell filling the balance of the space between the casing and the first-named shell, and having the steam-inlet slot and the cruciform openings; the shouldered blocks fitting in the central parts of the said openings and stopping the slots in the first-named shell; and means for angularly shifting the last-named shell, substantially as described.

10. In a valve, the combination of the casing having the ports and the steam inlet and exhaust; the main inlet-valve revoluble within the casing and having the diametrically opposite but non-communicating ports; the shell surrounding said valve and having the slot in line with the steam-inlet and the slots in line with the valve-ports, the slot in line with one valve-port being entirely stopped at two diametrically opposite points, and the other slot crossed at two points by radially-thinned junctures, substantially as described.

11. In a valve, the combination of the casing having the ports and the steam inlet and exhaust; the main inlet-valve having the peripheral, non-communicable ports; the shell surrounding said valve and having the annular slots in the planes of said valve-ports, the slot coacting with the live-steam port being stopped at two diametrically opposite points; cut-off blocks held in said slots; and a governor adjustably controlling said shell, substantially as described.

12. In a valve, the combination of the casing having the ports and the steam inlet and exhaust; the main inlet-valve revoluble within the casing and having the two diametrically opposite but non-communicable ports; the shell surrounding the said valve and having the slot in line with the steam-inlet, and the slots in line with the valve-ports, the slot in line with one valve-port being entirely stopped at two diametrically opposite points, and the other slot being crossed by radially-thinned junctures; a shell filling the balance of the space between said casing and the first-named shell, and having the slot in line with the said steam-inlet, and the four openings in the planes of the valve-ports, its inner surface being grooved in the plane of the slot having the radially-thinned junctures; and blocks held in said openings, substantially as described.

In testimony that I claim the foregoing invention I have hereunto set my hand this 4th day of March, 1901.

GILBERT R. ELLIOTT.

Witnesses:
F. E. CALLER,
A. B. UPHAM.